United States Patent [19]

D'Alto et al.

[11] Patent Number: 5,512,959

[45] Date of Patent: Apr. 30, 1996

[54] METHOD FOR REDUCING ECHOES IN TELEVISION EQUALIZER VIDEO SIGNALS AND APPARATUS THEREFOR

[75] Inventors: Viviana D'Alto, Milan; Fabrizio Airoldi, Feriolo di Baveno; Fabio Scalise; Maria G. Podestá, both of Milan, all of Italy

[73] Assignee: SGS-Thomson Microelectronics, S.r.l., Agrate Brianza, Italy

[21] Appl. No.: 255,436

[22] Filed: Jun. 8, 1994

[30] Foreign Application Priority Data

Jun. 9, 1993 [EP] European Pat. Off. .............. 93832053

[51] Int. Cl.$^6$ .................................................. H04N 5/21
[52] U.S. Cl. .......................................... 348/614; 348/607
[58] Field of Search ............................ 348/614, 607; 375/11, 12, 13, 14, 229, 230, 231, 232; 364/724.19, 724.2; H04N 5/21, 5/213

[56] References Cited

FOREIGN PATENT DOCUMENTS 0098748  1/1984  European Pat. Off. ....... H03H 21/00
0421526  4/1991  European Pat. Off. ....... H03H 21/00

OTHER PUBLICATIONS

IEEE Transactions on Consumer Electronics, vol. 38, No. 4, Nov. 1992, New York, pp. 767–777, S. Roy, et al., "Ghost Cancellation For Advanced Compatible TV Systems Using Complementary Sequences".

IEEE Transactions on Consumer Electronics, vol. 35, No. 3, Aug. 1989, New York, pp. 184–194, Melih Pazarci, "An Adaptive Ghost Processor For Broadcast Television".

ICASSP 90, vol. 2, S2VA Speech Processing 2, 1990 International Conference On Acoustics, Speech, And Signal Processing, Apr. 3–6 1990, Dirk Van Compernolle, "Switching Adaptive Filters for Enhancing Noisy and Reverberant Speech From Microphone Array Recording".

*Primary Examiner*—David E. Harvey
*Attorney, Agent, or Firm*—David M. Driscoll; James H. Morris; Randy J. Pritzker

[57] ABSTRACT

An adaptive method for suppressing video signal echoes in television equalizers including digital filters having coefficients which are updated in an adaptive and iterative manner using a modified LMS (Least Mean Square) algorithm until the difference, or output error, between a target output signal, called the reference signal, and an outgoing signal from the equalizer is gradually reduced. The method includes the steps of:

—applying a "combing" technique to an original filter having K*N coefficients in order to select K comb filters having N coefficients each;

—applying said LMS algorithm, with a variable convergence factor to each individual comb filter for a predetermined number of iterations;

—gathering the resultant configurations of the comb filter coefficients and selecting a subfilter with N largest modulo coefficients therefrom;

—updating the values of said N coefficients again by reiterating the LMS algorithm with variable convergence factor to said subfilter for a limited number of iterations;

—clearing all the coefficients with a lower modulo value than a predetermined threshold value;

—selecting a group of F coefficients by a slotting operation across those of said coefficients which have a cluster value: and —updating the value of said group of F coefficients, by reiterating the LMS algorithm with variable convergence factor, until the output error becomes smaller than a predetermined value.

20 Claims, 3 Drawing Sheets

$$H(z) = \frac{\sum\limits_{k=0}^{M} b_k z^{-i_k}}{1 + \sum\limits_{k=1}^{M} a_k z^{-p_k}}$$

| PROCESS OF CANCELLATION OF 3 ECHOES |||
|---|---|---|
| ECHO | DELAY (MAIN) | VOLTS |
| 1 | 40 | 0.4 |
| 2 | 100 | 0.2 |
| 3 | 150 | 0.3 |
Tab. 1
FIG. 3
PRIOR ART
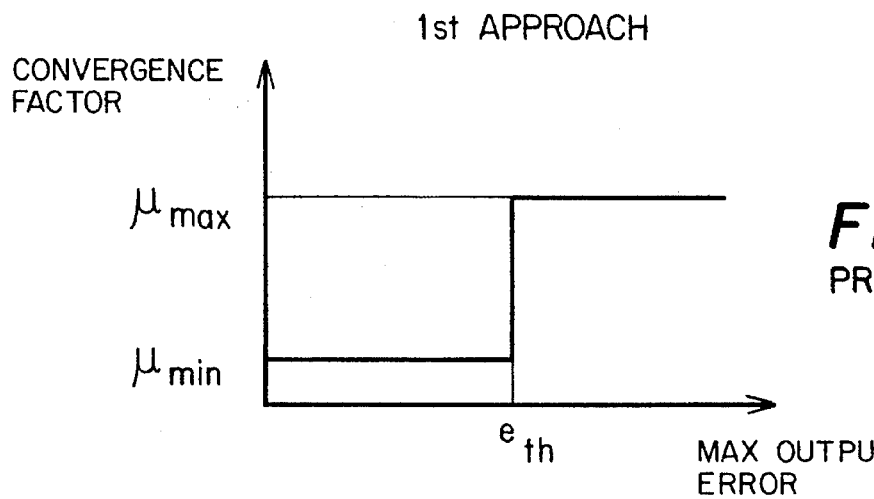
FIG. 4
PRIOR ART
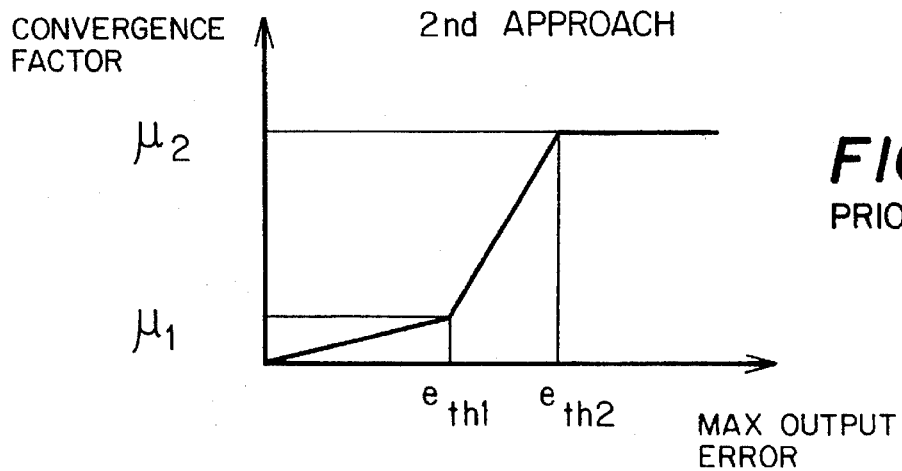
FIG. 5
PRIOR ART

METHOD FOR REDUCING ECHOES IN TELEVISION EQUALIZER VIDEO SIGNALS AND APPARATUS THEREFOR

BACKGROUND OF THE INVENTION

1. Field of the Invention

This invention relates to an adaptive method of suppressing video signal echoes in advanced television (TV) sets.

More particularly, the invention relates to an adaptive method of suppressing video signal echoes x(k) in equalizers of TV sets incorporating digital filters whose coefficients are updated in an adaptive and iterative manner using a modified LMS (Least Mean Square) algorithm until the difference, or output error, between a desired output signal d(k)—called the reference signal—and an outgoing signal y(k) from the equalizer is progressively reduced.

2. Discussion of the Related Art

As is well known, one of the main causes for deterioration of the TV picture quality on the displays of conventional analog TV receivers is the appearance of duplicates of the original signal which, by overlapping the primary image, create a so-called echo effect. TV echoes, best known as ghosts, are usually due to reflections undergone by the primary TV signal against fixed rebound surfaces, such as mountains, buildings, etc. Also, some moving objects, such as airplanes flying over the area between the TV transmitter and the TV receiver, may scatter the TV signal and generate such noise.

The echoes thus generated are presented to the receiver in the form of delayed, attenuated, and distorted duplicates of the primary image. The video echo phenomenon actually is a major deteriorating factor of TV pictures, and its influence is most noticeable on the recently introduced Improved Quality (IQTV) receivers and the High Definition (HDTV) wide screen TVs.

In fact, with such new generation TV sets, the doubled line scan frequency and the use of large size screens tend to enhance the ghost effect on the display.

Accordingly, while a standard TV receiver equipped with a channel equalizer can already provide a picture of significantly improved quality, the use of an equalizer is bound to become an absolute necessity in IQTV and HDTV sets.

For a better understanding of the invention aspects, a review of the traditional ghost-suppressing techniques is provided below. The ghost cancelling operation includes one of filtering the TV signal being input to the TV receiver.

The TV ghost cancelling process is usually based on a so-called equalization system. Since the characteristics of an RF video channel vary over time because they are strictly dependent on environment and operating conditions, the ghost cancelling process is most effective when an automatic equalization system of the adaptive type is used. Two different approaches are available for implementing a video channel equalization system; namely a direct method and an indirect method.

Many video channel equalizers are based on the identification of the video channel pulsive response and its inverse. This identification enables the coefficients of the system filters to be generated by a direct method. Although this technique performs accurately, it is highly complex from a computational standpoint.

Alternatively, an adaptive system based on an indirect method utilizes a ghost-suppressing algorithm which updates the values of the internal filter coefficients in an adaptive manner; that is, so as to gradually reduce the difference between a desired reference signal and the outgoing signal from the ghost-suppressing system.

The filtering section of an equalizer system may be either implemented by an F.I.R. method (Finite Impulse Response) or an I.I.R. (Infinite Impulse Response) method. The former uses FIR filters to approximate the infinite pulsive response from the video channel equalizer. The latter suppresses the ghost effect by means of IIR filters; that is, feedback FIR filters.

The first-mentioned method may be defined as a classic type and is widely used for suppressing TV echoes. However, while ensuring stability for its filters, it can provide no equalizer of the adaptive type unless recourse to a complicated hardware structure is made. In fact, each pole of the pulsive response from the ghost suppressor can only be approximated by a large number of zeroes, which significantly increases the number of the internal multipliers of the system.

The second-mentioned method provides for the use of an equalizer based on IIR filters. This method streamlines the system hardware and reduces the volume of the calculations required for the ghost suppressing operation, but its stability is not always ensured. Many adaptive algorithms intended for application to IIR filters have been defined and tested for stability, rate of convergence, and capability to remove TV echoes. Such algorithms stem from a classic algorithm known as Least Mean Square (LMS).

The updating rules for the coefficients of an LMS algorithm are the following:

$$ai(k)=ai(k-1)+m\ y(k-1-i)e(k-1)1<i<N\ bj(k)=bj\ (k-1)+s\ (k-1-j)e(k-1)1<j<M \quad (1)$$

where, $e(k)=d(k)-y(k)$.

The Greek letters m and s designate the adaptation pitch (also known as convergence factor) for the FIR and IIR filters, respectively; ai and bj are the coefficients of the IIR and FIR filters, respectively; x(k) and y(k) designate samples of the input and output signals to/from the equalizer; and e(k) is the output error, i.e. the difference between the target signal d(k) and the system output y(k).

Simulations carried out by applying the classic LMS algorithm to an IIR filter with M coefficients or taps have proved unsatisfactory especially in the presence of large amplitude echoes. Nonetheless, an analysis of the aggregate of the associated coefficients shows that:

— most of the coefficients have near-null values;

— the non-null values form clusters or local peaks during the adaptation process; and — the locations of such clusters on the delay line of the filter are closely related to the delays of the echoes which overlap the primary image.

FIG. 2 shows a typical pattern for the coefficients generated by the application of an LMS algorithm until a lower output error than a predetermined threshold is obtained. The simulation conditions are entered into Table 1 in FIG. 3, where the echo delays are set forth as sample numbers with the sampling period of 74 ns.

A more up-to-date ghost cancelling technique provides a determination of the locations of the largest amplitude clusters corresponding to the main signal overlapping echoes such that only the most significant filter coefficients will be updated, thereby reducing the computation volume and improving the algorithm rate of convergence. Thus, the secondary coefficients can be cleared as the corresponding multipliers are removed, which will relieve the structural complexity of the equalizer.

Understandably, the reduced coefficient aggregate is bound to differ, at the end of the adaptation process, from the configuration of the original aggregate. However, by suitably selecting the coefficients of the new reduced configurations, it becomes possible to re-create the right pulsive response from the echo suppressing system, even with a smaller number of multipliers. To accomplish this recreation, a so-called "combing" method has been used whereby several reduced coefficient configurations are selected by a "combing" procedure, starting with the original configuration. In other words, to create N comb filters, with M initial filter coefficients, one coefficient is selected every K periods, where K=M/N integer, starting with the first coefficient of the original filter.

The next "comb" of coefficients is obtained by shifting the immediately preceding comb through one coefficient, as follows:

Initial Configuration: a1 a2 a3 a4 a5 a6 a7 a8 a9

| First Comb: | a1 | | | a4 | | | a7 | | |
|---|---|---|---|---|---|---|---|---|---|
| Second Comb: | | a2 | | | a5 | | | a8 | |
| Third Comb: | | | a3 | | | a6 | | | a9 |

In this way, the combination of the partial coefficient configurations will cover the original configuration, leaving their intersections empty. Accordingly, it can be ensured that the merging of the partial configurations which results from the adaptation process will approximate, in an optimum manner, the original configuration of the coefficients, following the application of the algorithm.

Once the K combing filters with N coefficients each are selected, one of the early methods under consideration implied that:

— the LMS algorithm be applied to each combing filter for a fixed number (e.g. four) of iterations;

— the subfilter coefficients be gathered into the original aggregate of M coefficients; and — the LMS algorithm be applied to the most significant of the coefficients thus determined.

This sequence of operations defines an algorithm called CDFF (Cluster Detection with Fixed-convergence Factor) which has led to considerable improvements over the mere application of the LMS algorithm.

Further improvements in the performance of that algorithm have been attained by changing the adaptation pitch m (Equation 1) according to the value of the output error. In fact, the parameter m directly governs both stability and rate of convergence. However, this parameter also controls the amplitude of the coefficient fluctuations about their final value (Granularity Error); the higher the value of m, the greater is the algorithm rate of convergence, but the greater becomes the granularity error also. In other words, the value of m and the rate of convergence are directly proportional.

To obviate this drawback, it was introduced to vary the adaptation step with respect to the error e(k) according to a linear law whereby the angular coefficient changes between two values upon e(k) going below a given threshold. In this way, so far as the error e(k) between the cleaned signal from the adaptive equalizer and the desired signal stay high, m will maintain high values which decrease quickly with a decreasing error e(k). Upon e(k) dropping below a predetermined threshold, m will attain low values which decrease very slowly as e(k) decreases.

The above-described situation is depicted schematically in FIG. 3. Despite the improvement, the CDVF (Cluster Detection with Variable-convergence Factor) algorithm described above exhibits yet another drawback. During simulations, a delay line was considered which could accommodate post-echoes carrying delays of up to 14.6 µs. Accordingly, on completion of the combing step which presupposes the creation of K=3 comb filters, a further subfilter is obtained which consists of the M/3=N highest modulo taps. In the presence of three echoes, the N coefficients are substantially equally distributed over three clusters (approximately N/3 taps per cluster). In the presence of a single echo, all of the N coefficient will instead correspond to the single cluster provided.

Since the algorithm time of convergence is heavily dependent not only on the cluster "framing" —i.e. the determination of the peak largest coefficient—but also on the determination of the actual width of the cluster, progressive deterioration of the algorithm performance was encountered as the number of the echoes decreased, due to the above-mentioned over abundance of coefficients.

It is, therefore, an object of this invention to provide a novel adaptive method for suppressing video signal echoes in equalizer devices which substantially avoids the drawbacks associated with the various prior art methods mentioned above.

SUMMARY OF THE INVENTION

The idea on which this invention stands provides for the number of the coefficients of the final subfilter to be optimized in the adaptive algorithm to suit the number of the echoes, and hence the clusters, present. Based on this idea, the invention includes a method for suppressing video signal echoes in a television equalizer including digital filters having coefficients which are updated in an adaptive and iterative manner using an LMS algorithm until an output error is gradually reduced. The output error is equal to a difference between a reference output signal and an actual output signal from the equalizer. The method includes the steps of:

(1) applying a combing technique to a filter having K*N coefficients to select K comb filters having N coefficients each;

(2) applying the LMS algorithm having a variable convergence factor to each comb filter for a predetermined number of iterations;

(3) collecting resulting configurations of the comb filter coefficients and selecting a subfilter with N largest module coefficients;

(4) updating values of the N selected coefficients by reiterating the LMS algorithm to the selected subfilter for a limited number of iterations;

(5) clearing all of the coefficients with a lower modulo than a predetermined threshold value;

(6) selecting a group of F coefficients by a slotting operation across coefficients having a cluster value; and (7) updating values of the F coefficients by reiterating the LMS algorithm until the output error becomes smaller than a predetermined value.

The features and advantages of the inventive method and apparatus will become apparent from the following description of an embodiment thereof, given by way of illustration and not of limitation, with reference to the accompanying drawings.

BRIEF DESCRIPTION OF THE DRAWINGS

In the drawings:

FIG. 3 shows, in chart-form, the delay and amplitude values of echoes to be suppressed by the LMS algorithm;

FIGS. 4 and 5 are respective diagrams showing the pattern of a parameter m which controls the rate of convergence of a second (CDVF) algorithm according to the prior art;

DETAILED DESCRIPTION

Figure 1:
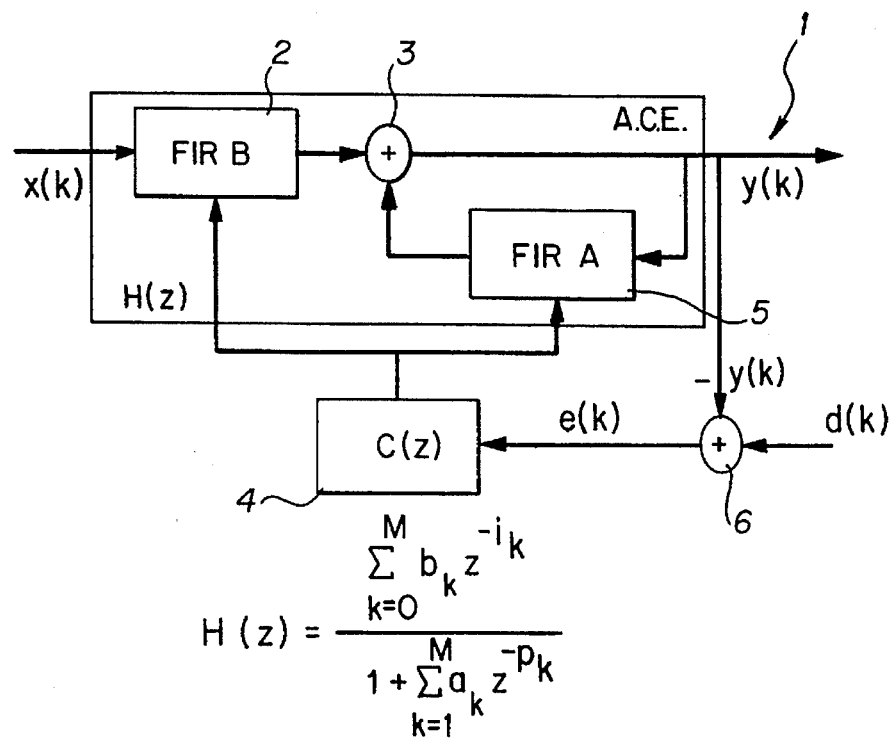
FIG. 1 is a diagramatic view of the architecture of an equalizer operated in accordance with the method of this invention.
Figure 2:
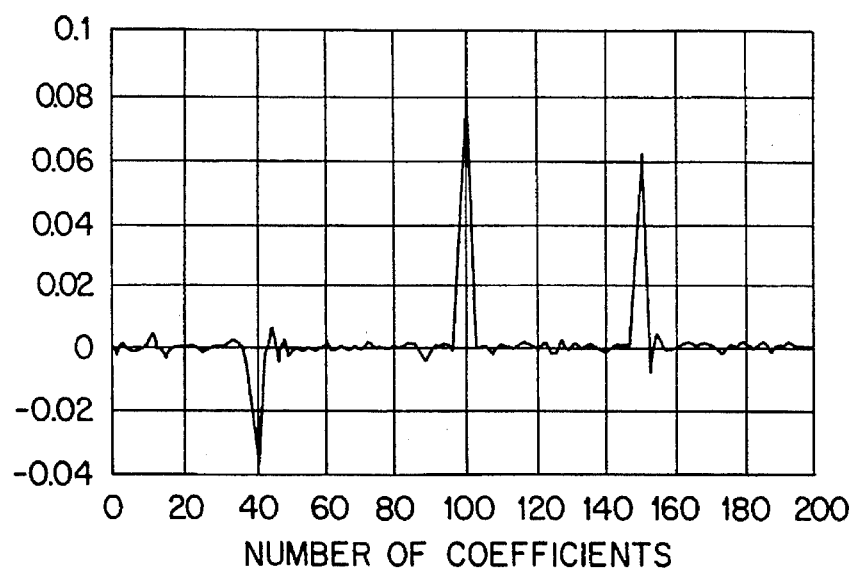
FIG. 2 is a diagram showing the typical pattern of coefficients generated by the application of an adaptive algorithm of the LMS type, according to the prior art.

With reference to the drawing figures, generally and diagramatically shown at 1 is an adaptive video channel equalizer or ACE (Adaptive Channel Equalizer) set up for operation according to the method of this invention. The equalizer 1 is, therefore, intended to implement an adaptive method for suppressing echoes of video signals with the aid of FIR filters. It should be noted that it is effective to update the coefficients of the filters which make up the equalizer system 1 such that the difference between an outgoing signal y(k) from the equalizer and a target signal d(k) outgoing equalization can be minimized.

The equalizer 1 includes a first digital filter 2 of the FIR (Finite Impulse Response) type which is input a sampled video signal x(k) and having an output connected to a summing node 3. The signal y(k) is output from the node 3 to form the equalizer output. That signal y(k) is input to a second digital filter 5 of the FIR type which has an output fed back to the node 3. This second filter 5 will operate, therefore, as a filter of the IIR type. Additionally, the output y(k) is provided to a second summing node 6, whereto said output y(k) subtracted from d(K). The node 6 also receives a signal d(k) which represents the target equalizer output. A signal e(k) is output from the node 6 and represents the output error.

In practice, the output y(k) from the equalizer is compared with a reference signal d(k) which constitutes the ideal output from the equalizer. This operation is performed using an appropriate off-line processing program. The difference between the two signals supplies the error e(k) whereby the method of this invention allows the process of adapting the filter coefficients to be carried out.

On completion of the process of selecting the most significant coefficients and adaptively updating them, thereby minimizing e(k), the computed coefficients are conveyed to the filters 2 and 5 through a block 4 identified by its associated function C(z) in the complex transform z. At this point, an on-line process of suppression of the video signal echo may start.

The method of this invention, also referred to by the acronym ACDVF (Advanced Cluster Detection with Variable-convergence Factor) hereinafter, is essentially the same as that of the algorithm CDVF up to the determination of the subfilter which has the largest modulo coefficients N. Presently the method of this invention is run through a process of fine adaptation of the selected coefficients based on application of the LMS law with variable m. This process is applied for L iterations to better define the main clusters. A few iterations are sufficient to segregate the primary peaks from the remaining peaks by 2–3 orders of magnitude. Thereafter, the most significant coefficients are selected for the echo suppressing process by clearing all the coefficients with a modulo below a predetermined threshold.

The threshold value is selected each time based upon the value of the largest modulo coefficient of the N selected coefficients. But the clearing of the coefficients below a certain threshold might depress the algorithm performance where, for example, a cluster coefficient was cleared which is instead essential to the suppression of the associated echo, such as the coefficient directly adjacent to the highest modulo tap.

Figure 7:
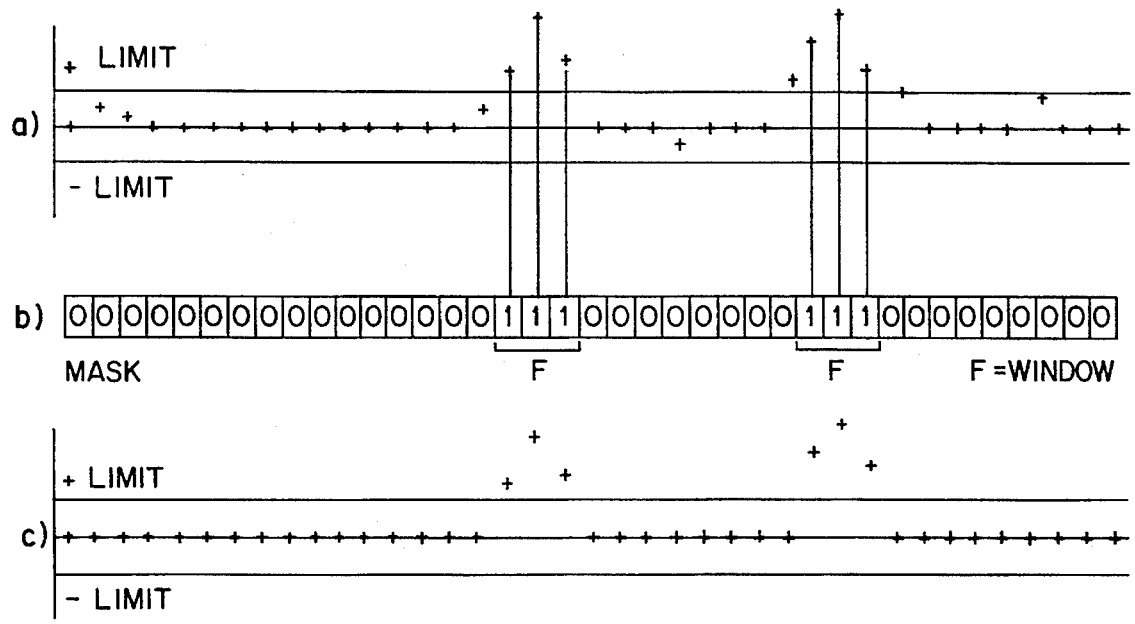
FIGS. 7a, 7b and 7c are respective diagrams related to coefficient selection steps provided by the inventive method.

To obviate this shortcoming, a slotting process is applied across the largest modulo coefficient of each cluster. The slotting operation consists of bringing to a logic value of "1" the F elements of a null value mask. The number of mask elements corresponds to the number of coefficients of the original filter. Such unitary values correspond to the F coefficients lying symmetrically across the highest modulo element of the cluster, as shown in FIG. 7b. At this point, the F coefficients which correspond to non-null elements of the mask are updated according to the LMS law with variable m, while the remaining coefficients are cleared.

Through the slotting operation, the number of the coefficients to be adapted is made equal to the product of the detected echoes and the width F of the slot. As a result, the largest number of coefficients to be updated, and hence the largest number of multipliers in the filtering section, will be 3*F, assuming an equalizer which reduces up to three echoes. During simulation, with F=5, excellent results were obtained, both relating to the degree of echo suppression and the algorithm rate of convergence. In addition, the filtering section of the equalizer only requires fifteen multipliers. Thus, the equalizer structure can be made far less complicated than that of prior art approaches.

Referring to the previous example, wherein the threshold operation erroneously eliminates a significant cluster coefficient, the slotting operation allows the cleared coefficient to be recovered and subjected to the adaptation process. Therefore, the clearing of that significant coefficient is not consequential because the adaptation process enables the coefficient to promptly attain its original value. In the event that the cluster is wider than the slot defined, as shown in FIG. 7a, coefficients with a modulo exceeding the threshold may also be cleared.

Simulations carried out by the Applicant have shown that, with 1–2 iterations, the final error first increases, and then decrease sharply by virtue of the higher rate of convergence of the present method which includes carrying out the adaptation process on a reduced number of coefficients.

Compared to the algorithms originating from the classic LMS algorithm, the method of this invention can have 4 to 5 times less iterations to bring the error output from the equalizer 1 below a predetermined threshold.

Figure 6:
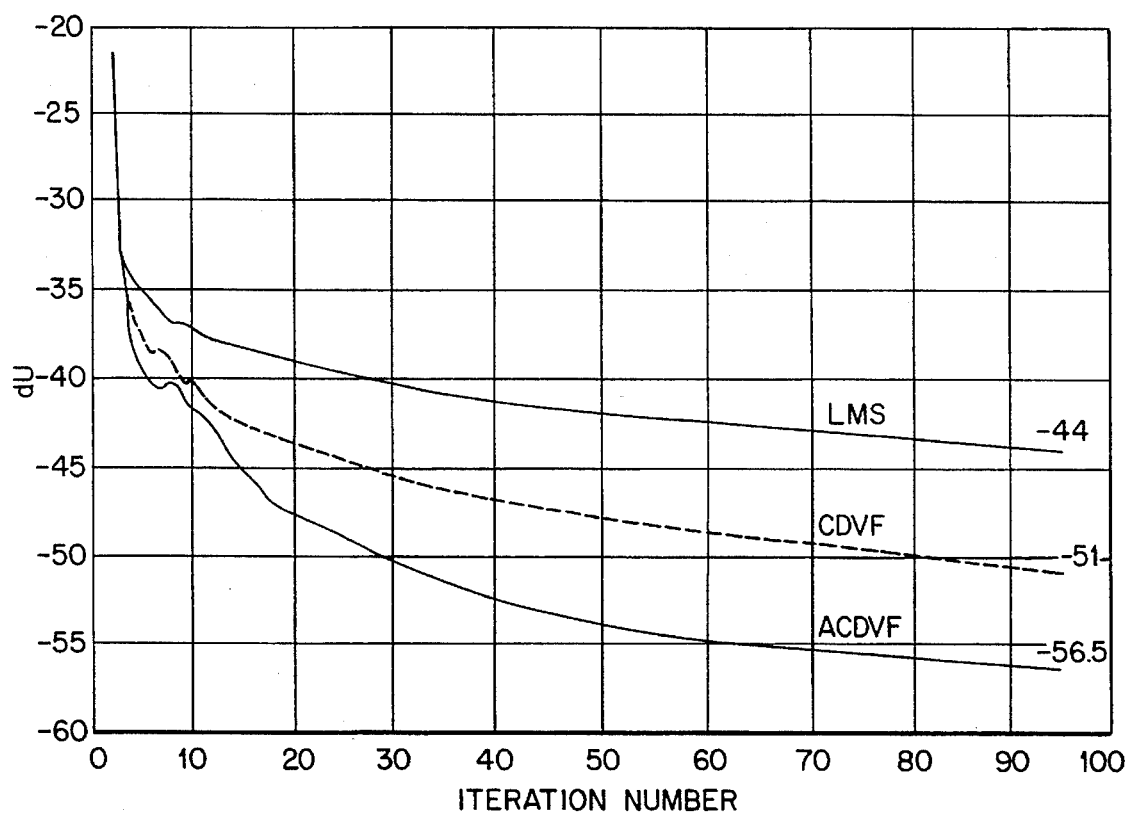
FIG. 6 shows a comparative diagram for "training" curves of the LMS algorithm, the CDVF algorithm, and the algorithm according to the invention.

Shown in FIG. 6 is a comparison of the training curves for the plain LMS algorithm, the CDVF algorithm, and the method of this invention. The latter quickly determines the delay of the echoes from the main signal, thereby allowing the video channel equalizer hardware to be significantly simplified both in terms of the multipliers required and the volume of computations to be carried out. This enhances the equalizer system performance.

The equalizer 1 of this invention can handle at least three video echoes.

In comparison to Japan and U.S.A., no reference signal for the GCR (Ghost Cancelling Reference) signal is available in Europe, which would be useful to immediately suppress ghost images. It is on this account that a signal called ITS (Insertion Test Signal) as supplied by R.A.I. Radiotelevisione Italiana (Italian Radio & TV Broadcasting Corporation) on line 17 has been used for reference. This ITS signal does not conform to many of the characteristics which are typical of ideal GCR signals. One of the worst faults of this ITS signal is that it cannot find out the delays of video echoes in any direct and accurate manner, as can the GCR signals defined in Japan or U.S.A.

However, the method of this invention enables the location of ghosts along the time axis to be found quickly and accurately irrespective of the reference signal which could be the ITS signal generated in Italy or other reference signals generated in other countries.

Accordingly, this equalizer system can be readily adapted to the GCR signals adopted in various countries and is, therefore, highly versatile.

It should be understood from the foregoing considerations that the method of this invention is highly innovative, in that the method:

—allows the locations of the echoes relative to the main signal to be quickly determined even if no suitable reference signal is available for suppressing the echoes;

—eliminates the problems from the redundant coefficients in the CDVF algorithm; and —reduces substantially the number of the coefficients of the filtering section of the ghost suppressor from the CDVF algorithm, greatly simplifying the equalizer architecture in terms of the number of multipliers required. In particular, the number of the multipliers required will solely depend on the width of the selected slot, once the largest number of echoes to be suppressed is set.

In other words, the method of this invention allows the locations of the video echoes to be quickly found relative to the location of the main signal, irrespective of the reference signal being used. Based on this information, the significant coefficients for the removal of ghost images can be selected, thereby drastically reducing the complexity of the video channel equalizer architecture by significantly cutting down the number of the multipliers required in the filtering structure.

Furthermore, the time required to find the final values of the coefficients of the equalizer internal filters is made much shorter than that usually required by such classic algorithms as the LMS, because of the gradual decrease of the filter coefficients to be adapted, affording reduced computational complexity for the method, and hence, increased rate of convergence over classic approaches.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An adaptive method for suppressing video signal echoes in a television equalizer including digital filters having coefficients which are updated in an adaptive and iterative manner using a modified least mean square (LMS) algorithm until an output error signal is gradually reduced, the output error signal being a difference between a reference output signal and an actual output signal from the equalizer, the method comprising the steps of:

(a) receiving an input signal;

(b) computing a difference between the input signal and the reference output signal;

(c) processing the input signal using the LMS algorithm having a variable convergence factor for a predetermined number of interations;

(d) processing the input signal by applying a combing technique to a filter having K*N coefficients in order to select K comb filters having N coefficients each;

(e) applying the LMS algorithm having a variable convergence factor to each comb filter for a predetermined number of interations;

(f) collecting resulting configurations of the comb filter coefficients and selecting a subfilter with N largest modulo coefficients;

(g) updating values of the N selected coefficients by reiterating the LMS algorithm with variable convergence factor to the subfilter for a limited number of iterations;

(h) clearing all of the coefficients with a lower modulo value than a predetermined threshold value;

(I) selecting a group of F coefficients by reiterating the LMS algorithm with variable convergence factor until the output error signal becomes smaller than a predetermined value; and (k) processing the input signal using the F coefficients provided by step (j).

2. The method according to claim 1 further including the step, before the step of clearing, of selecting a value of the predetermined threshold based on a largest modulo coefficient of the N coefficients selected.

3. The method according to claim 2 wherein the step of selecting by a slotting operation includes the step of selecting F elements substantially symmetrically disposed about an element with a largest modulo value.

4. The method according to claim 3 wherein the step of selecting further includes the step of bringing to a logic value one the elements selected.

5. The method according to claim 1 wherein the step of selecting a group includes the step of implementing a slotting operation across at least three coefficients having a cluster value.

6. The method according to claim 1 wherein the step of selecting a group includes the step of implementing a slotting operation across at least one coefficient having a cluster value.

7. A television equalizer comprising:

a first digital filter receiving a sampled video signal as an input and providing an output;

a first summing node, coupled to the first digital filter, receiving the output of the first digital filter and providing an output signal of the equalizer;

a second digital filter, coupled to the first summing node, receiving the output signal of the equalizer as an input and providing an output to the first summing node;

a second summing node, coupled to the first summing node, receiving as inputs the output signal of the equalizer and a reference signal, and providing as an output an error signal equal to a difference between the output signal of the equalizer and the reference signal; and an echo suppression circuit, coupled to the first and second digital filters, receiving as an input the error signal, selecting more significantly valued filtered coefficients of the first and second filters, adaptively updating the selected filter coefficients and providing the updated filter coefficients to the first and second filters to reduce the error signal.

8. A television equalizer according to claim 7 wherein the echo suppression circuit includes first and second outputs respectively connected to the first and second digital filters.

9. A television equalizer according to claim 7 wherein the first digital filter includes an FIR filter.

10. A television equalizer according to claim 7 wherein the second digital filter includes an FIR filter.

11. A television equalizer according to claim 8 wherein the first digital filter includes an FIR filter.

12. A television equalizer according to claim 11 wherein the second digital filter includes an FIR filter.

13. A television equalizer according to claim 7 wherein the echo suppression circuit includes a clearing circuit for clearing coefficients having a modulo value below a predetermined threshold value.

14. A television equalizer according to claim 13 wherein the echo suppression circuit includes a slotting circuit for bringing to a logic value one a number of coefficients having a cluster value.

15. A television equalizer comprising:

first filter means, receiving a sampled video signal as an input and providing an output;

first summing means, coupled to the first filter means, receiving the output of the first filter means and providing an output signal of the equalizer;

second filter means, coupled to the first summing means, receiving the output signal of the equalizer as an input and providing an output to the first summing means;

second summing means, coupled to the first summing means, receiving as input the output signal of the equalizer and a reference signal, and providing as an output an error signal equal to the difference between the output signal of the equalizer and the reference signal; and echo suppression means, coupled to the first and second filter means, receiving as an input the error signal, selecting more significantly valued filter coefficients of the first and second filter means, adaptively updating the selected coefficients, and providing the coefficients to the first and second filter means to reduce the error signal.

16. A television equalizer according to claim 15 wherein the echo suppression means includes first and second outputs respectively connected to the first and second filter means.

17. A television equalizer according to claim 16 wherein the first filter means includes an FIR digital filter.

18. A television equalizer according to claim 17 wherein the second filter means includes an FIR digital filter.

19. A television equalizer according to claim 18 wherein the echo suppression means includes clearing means for clearing filter coefficients having a modulo value below a predetermined threshold value.

20. A television equalizer according to claim 19 wherein the echo suppression means includes slotting means for bringing to a logic value one a number of coefficients having a cluster value.

* * * * *

UNITED STATES PATENT AND TRADEMARK OFFICE

CERTIFICATE OF CORRECTION

PATENT NO. : 5,512,959

DATED : April 30, 1996

INVENTOR(S): Viviana D'ALTO, Fabrizio AIROLDI, Fabio SCALISE and Maria G. PODESTA It is certified that error appears in the above-identified patent and that said Letters Patent is hereby corrected as shown below:

On the title page, item

[30] Foreign Application Priority Data

Jun. 9, 1993 [EP] European Pat. Off. ...............93830253

Signed and Sealed this

Sixteenth Day of July, 1996

*Attest:*

BRUCE LEHMAN

*Attesting Officer*     *Commissioner of Patents and Trademarks*